Figure 1:
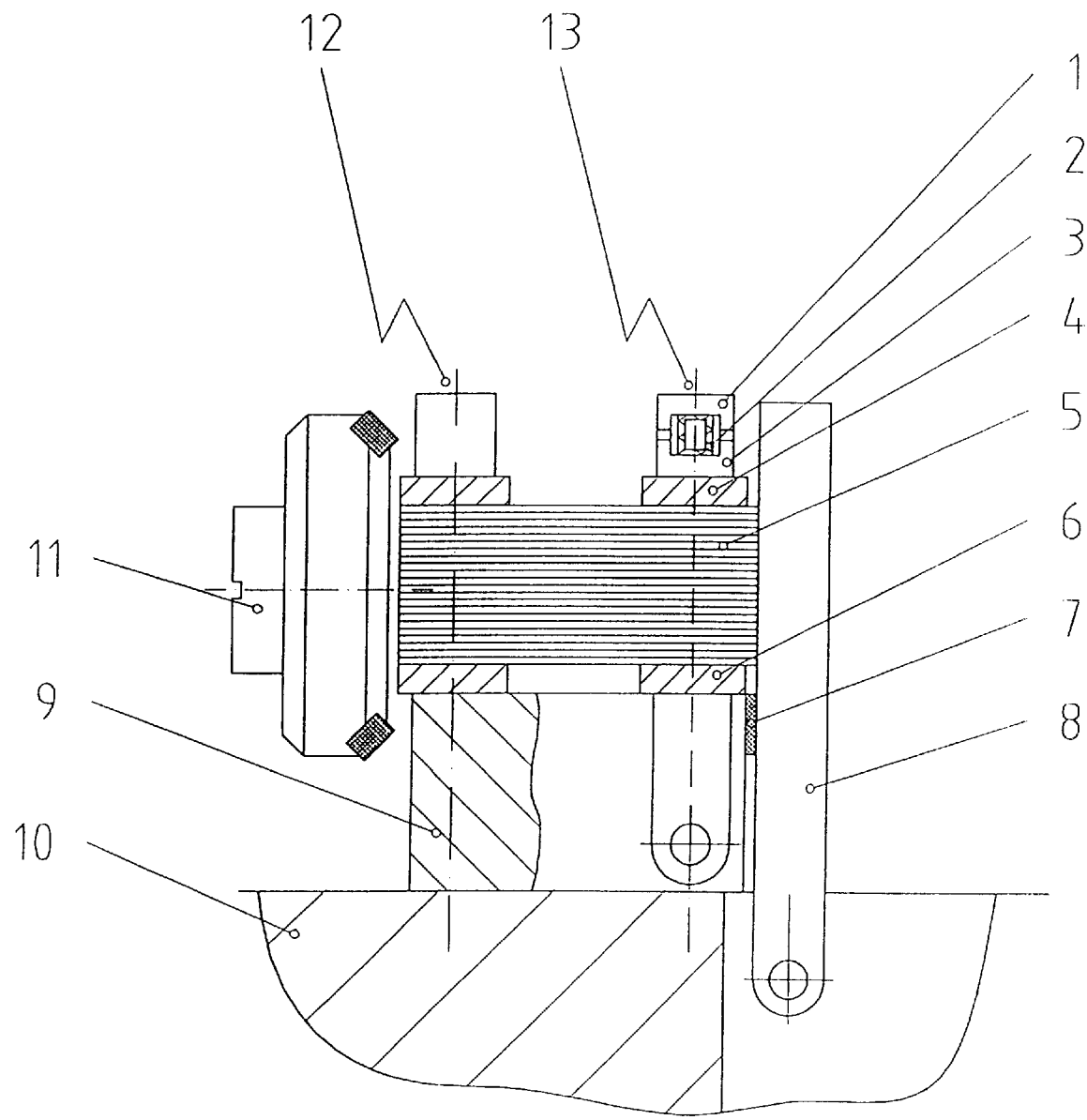

United States Patent

Gnann et al.

Patent Number: 6,116,829
Date of Patent: Sep. 12, 2000

[54] APPARATUS FOR MACHINING AT LEAST ONE EDGE OF AT LEAST ONE SHEET METAL PLATE

[75] Inventors: Rüdiger A. Gnann, Ravensburg; Michael Strobel, Ostrach, both of Germany

[73] Assignee: Maschinenfabrik, Karl H. Arnold GmbH & Co. KG, Ravensburg, Germany

[21] Appl. No.: 08/938,897

[22] Filed: Sep. 26, 1997

Related U.S. Application Data

[62] Division of application No. 08/558,075, Nov. 10, 1995.

[51] Int. Cl.⁷ ........................................ B23C 1/30
[52] U.S. Cl. .................... 409/132; 409/197; 269/296
[58] Field of Search .................... 409/132, 138, 409/139, 197, 218, 225; 269/296, 71, 43

[56] References Cited

U.S. PATENT DOCUMENTS

| | | | |
|---|---|---|---|
| 1,942,873 | 1/1934 | Narrow | 409/132 |
| 2,010,922 | 8/1935 | Leonard . | |
| 2,659,278 | 11/1953 | Schultz . | |
| 3,129,447 | 4/1964 | Ralphs . | |
| 3,170,271 | 2/1965 | Unterbrink et al. . | |
| 3,762,273 | 10/1973 | Sprung . | |
| 3,909,580 | 9/1975 | Krakow . | |
| 3,922,951 | 12/1975 | Linsinger . | |
| 4,018,134 | 4/1977 | Linsinger | 90/15 R |
| 4,462,147 | 7/1984 | Herb et al. | 409/132 |
| 4,604,011 | 8/1986 | Rungger et al. | 409/138 |
| 4,648,762 | 3/1987 | Hall et al. . | |
| 4,799,836 | 1/1989 | Kurisu et al. | 409/138 |
| 4,827,100 | 5/1989 | Frings et al. . | |
| 4,995,935 | 2/1991 | Ganzberger | 156/499 |
| 5,096,346 | 3/1992 | Ueda | 409/203 |
| 5,172,846 | 12/1992 | Hayashi et al. | 269/43 |
| 5,467,972 | 11/1995 | Lee et al. | 269/118 |

FOREIGN PATENT DOCUMENTS

| | | |
|---|---|---|
| 0279866 | 3/1992 | European Pat. Off. . |
| 2257255 | 7/1975 | Germany . |
| 4110418 | 5/1992 | Germany . |
| 54-9132 | 1/1979 | Japan . |
| 1311654 | 3/1973 | United Kingdom . |

*Primary Examiner*—Andrea L. Pitts
*Assistant Examiner*—Adesh Bhargava

[57] ABSTRACT

The invention relates to a process of butt-welding together sheet metal plates, in particular those having different sheet metal thicknesses, by means of an edge preparation to the extent that the edges of the sheet metal plates are milled in a sheet metal stack (5). For this purpose, the appropriate apparatus has a supporting and clamping means (1, 2, 3, 9, 10).

4 Claims, 2 Drawing Sheets

APPARATUS FOR MACHINING AT LEAST ONE EDGE OF AT LEAST ONE SHEET METAL PLATE

This application is a division of Ser. No. 08/558,075 filed Nov. 10, 1995.

DESCRIPTION

The invention relates to a process for butt-welding together sheet metal plates by beam welding to produce so-called tailored blanks, that is planar forms with different sheet thicknesses, and to an apparatus for machining at least one edge of a sheet metal plate in preparation for the butt-welding.

In future, particularly in the automobile industry, galvanized sheet metal with different sheet thicknesses will be butt-welded together in large quantities and so-called tailored blanks, i.e. made-to-measure plates will be produced. On account of the use of different sheet thicknesses, in the area of safety, the statutory requirements in a crash situation and, in the remaining area, by weight reduction, the performance to weight relationship are improved. In most automobiles on the market today, for example, unitary sheet metal thicknesses are used in doors and the inner door, which is soft-trimmed, is reinforced with tubes so that better impact protection is provided. The same safety can be achieved, for example, if the inner door is produced from thick metal sheets in the lower region and from thin metal sheets in the window area. Other new methods, for example, consist in producing a vehicle door from four parts by means of a beam welding process.

The purpose of producing such tailored blanks is the reduction in the vehicle weight, the saving of transport costs by delivery by the steel producer of preassembled plates to the automobile pressing works and the reduction of the use of semi-finished material (galvanized sheet metal) because, for example, by welding together several parts, there is no longer any waste material in the case of a vehicle door produced from the window section.

When galvanized sheet metal is welded with the laser beam, the zone in which the zinc on the upper surface burns is so narrow that the corrosion resistance is maintained on account of the remote effectiveness of the zinc coating. The welding together of galvanized metal sheets, in particular of different sheet thicknesses, is disclosed, for example, in EP 0 279 866 B1. According to this document belonging to the state of the art, a formed body is produced from sheet metal parts of different thicknesses by butt-welding together flat sheet metal parts of different thicknesses into one unit with a laser beam in accordance with the later stress on the shaped body and the unit consisting of the butt-welded flat sheet metal parts is reformed by drawing or pressing it into the formed body.

An apparatus is known from GB-1-311 654 for machining sheet metal edges which are intended to be butt-welded together. In this, several metal sheets can be collected together in a stack. The machining process can be carried out by milling.

The aim of the present invention is to achieve optimal process reliability when butt-welding together sheet metal plates having different sheet thicknesses in the case in which the welding ensues by means of beam technology (laser beam, electron beam or the like).

This object is solved in accordance with the present invention in that, for the butt-welding together of sheet metal plates by beam welding to produce so-called tailored blanks, i.e. planer forms with different sheet thicknesses, the following process steps are carried out:
a) collecting several sheet metal plates together in a sheet metal stack
b) aligning at least one edge side of the sheet metal stack
c) clamping the aligned sheet metal stack with the interpositioning of wearing bars on both sides on the machining side
d) machining the aligned edge side of the sheet metal stack
e) abutting the machined edges of sheet metal plates machined according to d) and
f) welding together the sheet metal plates at the abutted edges.

On account of the previously mentioned special machining and the consequently ensuing edge preparation for welding, a "zero gap" can be achieved upon abutment, which produces optimum process reliability in connection with the butt-welding, in particular of sheet metal plates which have different sheet metal thicknesses. In this case, it is irrelevant whether the plane surface of two sheet metal plates of different thicknesses lies at the top or the bottom.

This type of edge preparation is relatively simple and can be effected in such a short time that this edge preparation can be placed in series production without producing delays.

As a result of achieving a "zero gap" at the butt-joint of the sheet metal plates, the process speed is increased. This particular manufacturing method allows any desirable contours, even curved ones, to be used with great precision by using a suitable tool. Therefore, the production process for so-called tailored blanks is considerably expanded. A uniform process operation can be attained.

A small amount of material is removed from the wearing bars during the machining process. However, the support of the wearing bars prevents the sheet metal lying in the edge zone from bending during machining.

The machining preferably ensues by means of milling. During machining, for clamping, the sheet metal stack can be additionally supported at the side which lies opposite the side being machined so that there is a resistance to the machining pressure without a displacement of the sheets or the sheet metal stack itself.

The edge preparation of the kind mentioned above ensues by means of an apparatus for machining at least one edge of a sheet metal plate and this apparatus has a supporting and clamping means for a sheet metal stack as well as a machining tool for machining one edge side of the sheet metal stack so that several edges can be machined simultaneously in one operating step in a particularly useful manner.

The previously revealed wearing bars are arranged in this apparatus between clamping parts of the supporting and clamping means and the sheet metal stack.

Usefully, at least two clamping regions are provided, one of which in the vicinity of the machining tool is stationary or arranged to be advancable and the other of which is arranged at a distance thereto and is transversely displaceable or transversely displaceable and pivotable and advancable. In this manner, it is continuously ensured that a clamping always ensues directly in the vicinity of the machining location and that the further clamping or clampings can be carried out in dependence on the size of the sheet metal plates at a further suitable location to safely prevent sliding of the aligned sheets and, thus, to ensure an exact edge preparation for welding. In this case, the clamping force preferably ensues only from above.

In order to be able to align the sheet metal stack for the edge machining, a clamping part is arranged on the side of the sheet metal stack which lies opposite the machining tool and is provided for abutment against the sheet metal stack to produce alignment, this clamping part being arranged to be capable of being pivoted and/or transversely displaced.

Figure 2:
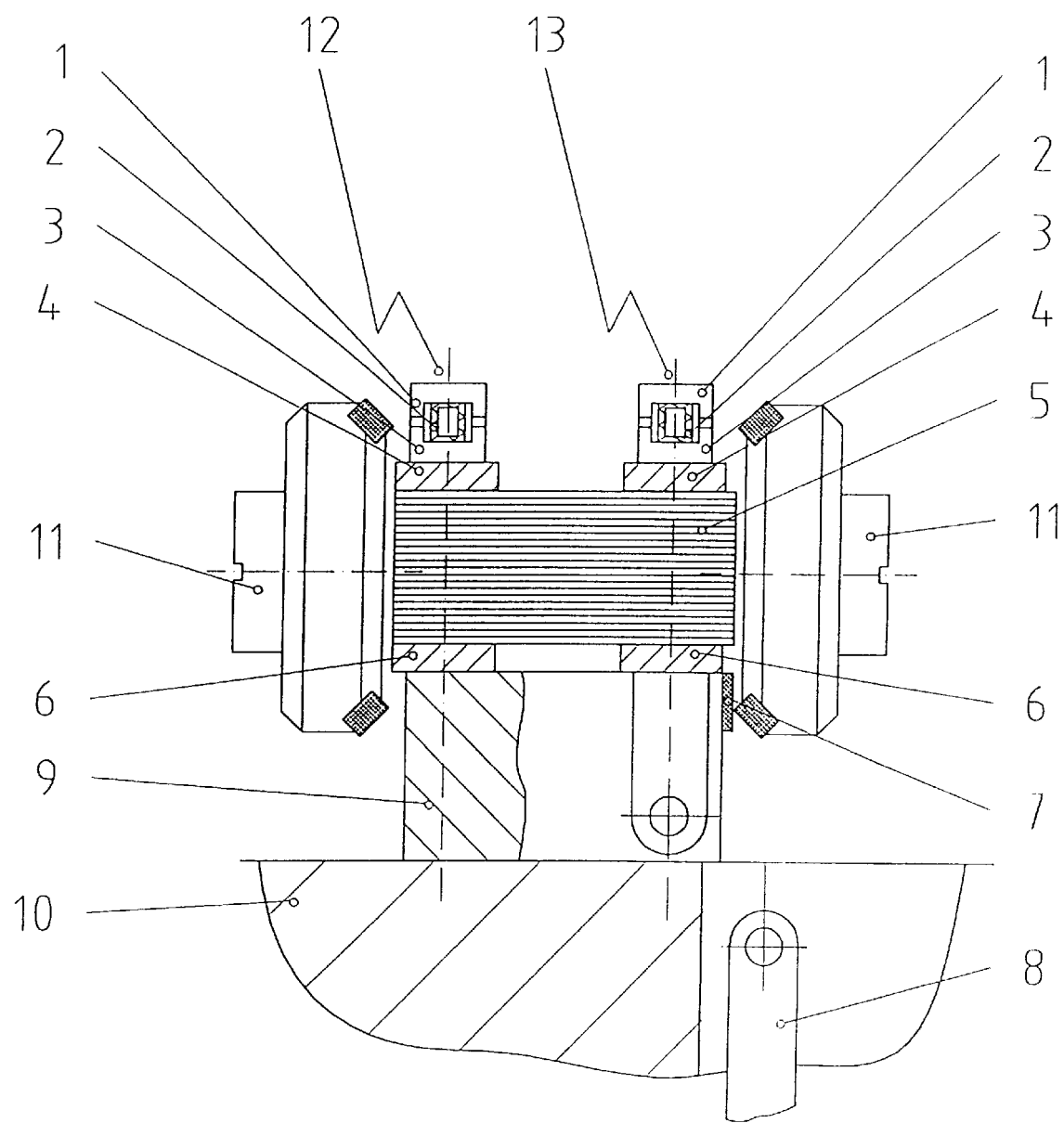

The invention is described in more detail in the following with reference to exemplary embodiments schematically illustrated in the drawings, in which:

FIG. 1 shows a sectional view through an apparatus for edge preparation of sheet metal plates, to be butt-welded together, in a sheet metal stack with a milling tool arranged on one side, and FIG. 2 shows a corresponding view with two milling tools.

The reference sign 10 in the drawings designates a base plate with an assembly plate 9 arranged thereabove. Arranged on top of this is a sheet metal stack 5 consisting of a plurality of aligned, overlying sheet metal plates. There are wearing bars 4 and 6 provided on both sides of the sheet metal stack 5. In two clamping regions 12 and 13, of which the left-hand one in the Figure is fixedly associated with the machining tool, but advancable, and of which the right-hand one is capable of being changed in position and advancable, there is a clamping bracket 1 and a clamping bar 3 between which a tubular cylinder is arranged. The clamping bracket 1 in the clamping area 13 is pivotable and also transversely displaceable, on the one hand, for adaptation to different sheet metal plate sizes and, on the other hand, to move the clamping bracket in and out.

In FIG. 1, on the left-hand edge side of the sheet metal stack 5, there is a milling tool 11 (cutting head) for machining this edge side of the sheet metal stack to prepare the edges of the sheet metal plates of the sheet metal stack for a process of butt-welding in such a manner that it is possible to produce the butt joint without a gap. This precise edge preparation is made possible on account of the machining of the edges in the stack, as schematically shown in the drawing.

At the side of the sheet metal stack 5 opposite the milling tool 11, there is a clamping guide bar 8 which abuts against a stop 7 and by means of which the sheet metal stack 5 can be aligned for clamping in the correct position. This clamping guide bar 8 can be pivoted away if a machining of the sheet metal stack is also to be carried out on this side. However, it can also be stationary in the clamping region of the machining device.

The clamping guide bar 8 is shown in FIG. 2 in the position in which it has been pivoted away after the alignment of the sheet metal stack 5. On this side of the sheet metal stack 5 there is a further milling tool 11.

DESCRIPTION OF OPERATION

The sheet metal plates are normally delivered in a stacked form in transport frames for processing. Firstly, as a preparation for the welding seam connection, an edge machining of the sheet metal plates is carried out. In this case, the edge machining of the sheet metal stack as a package takes place by means of milling. For this milling, the sheet metal stack is carefully vertically aligned in the transverse and longitudinal directions because the edge regions of the metal sheets would otherwise be bent on account of the applied stress.

Located at a loading portal is crane gear which can engage beneath the stack. By means of parallel grips, the stack is vertically aligned in the longitudinal and transverse directions. The alignment is enhanced by impulses (for example, an impact cylinder). The sheet metal stack is then placed in an apparatus according to the drawing and subsequently machined, after which the sheet metal stack is put back in the transport frame. Following placement of the sheet metal stack in the apparatus, the clamping brackets 1 are moved over the sheet metal stack. In the loading area, clamping guide bars 8 which stand vertically are pressed from both sides against the sheet metal stack 5. Subsequently, wearing bars 4, 6 are moved against the clamping guide bars at the support 9 and at the clamping brackets 1, 3. After positioning the stack, the clamping brackets 1 are subjected to a hydraulic force from above and the sheet metal pack is pressed on both sides. The clamping guide bars 8 move into their initial position (according to FIG. 2) and the milling slide with the milling tool 11 drives through a cutting head passage. According to requirements, the milling units carry out a cyclical operating procedure with one or more milling passes. The setting of the milling path is adjusted in advance, as in the case of the milling cycles. The milled sheet metal stacks are subsequently supplied after machining to the welding unit where the machined edges are abutted against one another and, on account of the optimal edge machining and edge preparation, without a gap in the butt joint so that an optimal welding process can be carried out, in particular when a butt joint of sheet metal plates of different thicknesses ensues. In this case, it is irrelevant whether the plane surface of two metal sheets of different thickness lies at the top or the bottom.

We claim:

1. An apparatus for machining at least one edge of at least one sheet metal plate in preparation for butt-welding comprising: a supporting and clamping means for a sheet metal stack, a machining tool for machining an edge of the sheet metal stack and wearing bars arranged between the supporting and clamping means and the sheet metal stack at the side of the sheet metal stack to be machined such that the wearing bars are positioned to be machined by the machining tool during machining of the sheet metal stack.

2. An apparatus according to claim 1, further comprising: at least two clamping areas, one of which is fixedly associated with the machining tool in its vicinity, but advancable, and the other, spaced therefrom, is transversely displaceable or transversely displaceable and pivotable and advancable.

3. An apparatus according to claim 1 or 2, further comprising: a clamping guide bar for aligning the sheet metal stack arranged on the side of the sheet metal stack which lies opposite the machining tool.

4. An apparatus for machining at least one edge of at least one sheet metal plate in preparation for a process of butt-welding together sheet metal plates by means of beam welding to produce tailored blanks the apparatus comprising:

means for aligning at least one edge of each of the sheets along a side of the sheet metal stack;

means for clamping the aligned sheet metal stack between clamping and supporting means with the interpositioning of wearing bars between the stack and the clamping and supporting means, on the side of the stack to be machined, such that the wearing bars support the edge of the stack that will be machined and experienced some wear during the machining;

means for machining the aligned edge side of the sheet metal stack and means for welding together the sheet metal plates at abutted edges.

* * * * *